US005653304A

United States Patent [19]
Renfroe

[11] Patent Number: 5,653,304
[45] Date of Patent: Aug. 5, 1997

[54] LEVER STEERING SYSTEM

[75] Inventor: David A. Renfroe, Fayetteville, Ark.

[73] Assignee: University of Arkansas, N.A., Little Rock, Ark.

[21] Appl. No.: 466,375

[22] Filed: Jun. 6, 1995

Related U.S. Application Data

[63] Continuation-in-part of Ser. No. 230,311, Apr. 20, 1994, Pat. No. 5,435,407.

[51] Int. Cl.⁶ .................................................. B62D 5/00
[52] U.S. Cl. .................. 180/402; 180/403; 364/424.051
[58] Field of Search ............................. 180/400, 402, 180/403, 408, 411, 412, 414, 315; 364/424.01, 424.051, 424.052, 424.053, 424.054

[56] References Cited

U.S. PATENT DOCUMENTS

| | | | |
|---|---|---|---|
| 1,610,580 | 12/1926 | Nicholson | 280/773 |
| 1,621,916 | 3/1927 | Williams et al. | 280/773 |
| 2,111,668 | 3/1938 | Latzen | 280/773 |
| 2,171,157 | 8/1939 | Mathews | 280/660 |
| 2,229,394 | 1/1941 | Stinne | 280/773 |
| 2,757,014 | 7/1956 | Schmitz | 280/773 |
| 3,063,731 | 11/1962 | Liverance | 280/773 |
| 3,482,398 | 12/1969 | Christensen | 60/52 |
| 3,933,215 | 1/1976 | Scheuerle | 180/411 X |
| 4,006,664 | 2/1977 | Brown | 91/171 |
| 4,263,979 | 4/1981 | Sturgill | 180/411 |
| 4,823,899 | 4/1989 | Ron | 180/411 |
| 4,986,387 | 1/1991 | Thompson et al. | 180/212 |
| 5,014,802 | 5/1991 | Knoll et al. | 180/408 |
| 5,090,512 | 2/1992 | Mullet et al. | 180/236 |
| 5,094,312 | 3/1992 | Hakel | 180/132 |
| 5,201,380 | 4/1993 | Callahan | 180/403 |
| 5,325,935 | 7/1994 | Hirooka et al. | 180/411 X |

*Primary Examiner*—Victor E. Johnson
*Attorney, Agent, or Firm*—Robert R. Keegan; Head, Johnson & Kachigian

[57] ABSTRACT

A steering system in an all-terrain four-wheeled vehicle with independent suspension wherein necessary forces for wheels to respond to steering control is supplied by fluid pressure or electrical actuators mounted parallel to the suspension arm between vehicle frame and wheel control arm, steering control by the driver being by manipulation of right and/or left steering levers eliminating the need of steering wheel and steering column in front of the driver. The steering actuators are independent and there is no tracking rod or other linkage for coordinating their turning angles; rather, close coordination of the wheel turning angles for achieving the Ackerman angle relation or other non-linear turning angle relation between the wheels is by a now-linear linkage between left and right steering levers or elsewhere or by a computer control for electric actuators. Optionally, a computer control in an electrical system has inputs for acceleration and velocity for detecting hazards associated with steering and inputs to provide artificial feel signals to the hand levers.

17 Claims, 5 Drawing Sheets

LEVER STEERING SYSTEM

This application is a continuation in part of patent application Ser. No. 08/230311 filed Apr. 20, 1994 for HYDROSTATIC MANUAL VEHICLE STEERING SYSTEM, now U.S. Pat. No. 5,435,407.

BACKGROUND OF THE INVENTION

1. Field of the Invention

The present invention relates to steering systems for wheeled vehicles, particularly such vehicles with at least two steerable wheels under manual control of a driver and in which the steerable wheels are independently suspended from the vehicle body frame. More generally, the invention is applicable to steering systems for wheeled vehicles with at least two steerable wheels. By the present invention, the necessary forces for causing each of the steerable wheels to properly respond to the steering control provided by the driver is effectuated between the vehicle body and the (usually independently suspended) steerable wheel control armby a fluid pressure or electrically powered actuator. The coordination of the left wheel and right wheel motion is attained, not with the usual mechanical link between steering control arms for the wheels, but rather by two distinct control signals provided to each of the actuators. These two signals and, hence, the motions imparted by the respective actuators have a predetermined non-linear relation which can be produced by non-linear coupling mechanism or by an electronic digital or analog computer. An advantage of the system of the invention is that the necessity for a conventional steering column is eliminated along with the safety hazard that such columns present for the driver in the event of a mishap. Another advantage is that it facilitates a very large angle of vertical travel for the independent suspension arms which is desirable for some vehicles and virtually impossible to obtain in conventional steering systems.

The present invention is in sharp contrast to the traditional wheeled vehicle steering system. The structure, adjustment, and alignment of the steering mechanism of a wheeled vehicle is a somewhat complicated matter involving various relationships of each steerable wheel axle to the vehicle body referred to as caster, camber, toe-in, Ackerman angle and the like. No attempt is made here to present a detailed discussion of all these factors, except as they relate to the improvements of the present invention.

For many decades, the steering system for automotive vehicles has utilized a front axle which does not rotate about a vertical axis when the vehicle is steered to the right or the left. Rather, each front wheel is provided with a stub axle which is rotatable about a vertically disposed king-pin. Accordingly, it is necessary to provide means by which the front wheels turn to the left or turn to the right together in a coordinated fashion. It was long ago determined that optimum steering was not achieved with strictly parallel motion of the front wheels because the outwardly turning wheel is closer to the vehicle turning center than the inwardly turning wheel and needs to rotate through a greater angle. This refinement and provision for steering control is referred to as the Ackerman angle provision.

A common and conventional wheeled vehicle steering system provides for the rotation of the steering column or steering shaft to be converted into linear motion of a link which imparts a rotating motion to the stub axle of the wheel through a steering control arm extending from the stub axle. The common means for providing coordinated motion of the two steerable wheels includes a track arm which also is fixed with respect to the stub axle on each wheel together with a track rod extending between the two track arms so that the two front wheels are constrained to move in a predetermined relationship either to the right or to the left. In most cases the linkage provided does not maintain the wheels parallel but rather provides a nonlinear turning relationship which takes into account the Ackerman angle provision.

Hydraulic systems have been incorporated in conjunction with wheeled vehicle steering systems and perhaps the most common form of such hydraulic system is a power assist for the steering shaft which retains the above-discussed track rod and track arm arrangement for coordinating turning motion of the steerable wheels. As mentioned above, the present invention eliminates reliance upon a track rod or other direct mechanical linkage between the left and right steerable wheels by causing the turning motion of each wheel to be effected by its own independent hydraulic actuator or electrical actuator having no operative connection back to the vehicle body other than that provided by hydraulic tubing or electrical cables.

Steering systems for wheeled vehicles have been proposed in prior patents which employ hydraulic cylinders, but known steering systems employing hydraulic cylinders have commonly provided positive coordination with servomotors or direct mechanical connection between the left side and the right side wheel.

The hand lever actuated manual steering system of the present invention provides the advantage of removing the necessity of a steering wheel. The control of the vehicle may be accomplished with one or two hands. The double handle configuration gives the operator a sense of driving a motorcycle using the handle bars except the center section of the handle bars is not present. This allows entry and exit to the vehicle through the front of the vehicle if desired, and it removes the danger of the steering wheel and the necessary support structure upon which a person may be injured and impaled in the event of accidents. This then allows increased ride-down distance which can be incorporated into the vehicle restraint system to reduce injuries.

The Ackerman steering is accomplished by a system of bellcranks and tie rods below the seat or elsewhere in the cockpit and not with the angular relationships of the steering arm, steering knuckle, and actuating cylinder.

The designer is free to set parameters of these elements to optimize suspension travel and to prevent bump steer. The steering actuator may be a linear actuator mounted parallel to arms of the suspension system or may be a rotary actuator which mounts on the steering axis of each wheel.

Steering alignment is made simple and easy by opening a valve on steering control cylinders located in the cockpit and then aligning the wheels and handle positions then closing the valves.

2. Prior Art

U.S. Pat. No. 5,094,312 to Hakel dated Mar. 10, 1992 (U.S. Cl. 180/132) shows a vehicle steering system in which the left and right steering control arms for the front wheels are both operated by a single double-acting hydraulic piston with oppositely directed piston rods each coupled by a mechanical link to a respective steering control arm. This single piston arrangement is in effect a direct mechanical linkage from the left side wheel to the right side wheel and there are not two independent hydraulic cylinders for the respective left and right steerable wheels. U.S. Pat. No. 4,986,387 to Thompson et al., dated Jan. 2, 1991 (U.S. Cl. 180/212) shows a steerable wheeled vehicle with a steerable wheel for which turning motion is provided by hydraulic cylinder and a rack and pinion, but, since there is only one steerable wheel, it provides no teaching with respect to coordination of two steerable wheels relevant to the present invention.

U.S. Pat. No. 5,090,512 to Mullet et al., dated Feb. 25, 1992 (U.S. Cl. 180/236), like the patent to Hakel, relies on a direct mechanical connection from the left side to the right side of the steering system including a rotatable shaft and cam pulleys operating a cable arrangement for wheel steering. U.S. Pat. No. 4,006,664 to Brown has hydraulic operated steering, but like the patent to Hakel has only a single cylinder for left and right wheels, the coordinated motion of which must be provided by a linkage connecting left and right wheels with the single cylinder provided for their operation.

U.S. Pat. No. 2,757,014 to Schmitz, dated Jul. 31, 1956 (U.S. Cl. 280/87) discloses a steering system for a tractor having pairs of control cylinders and operating cylinders for providing steering motion to the respective front wheels which is independently controlled, there being no tie-rod connecting to the two front wheels. Although the independent control of the two front wheels is arranged so that there is a non-linear relationship between the steering motion of the left wheel and the right wheel, this non-linear relationship is not for the purpose of providing a desired Ackerman angle relationship in the steering mechanism, but, rather, is to facilitate very sharp turning of the tractor vehicle about either the left rear wheel or the right rear wheel. Accordingly, the stated objective of the steering system is solely to arrive at an extreme or limit position for the wheels in which the left wheel is turned by ninety degrees and the right wheel is turned by about fifty degrees (or vice versa). No Ackerman angle is sought or achieved for modest steering motions and, as the description states, any slight steering movement of the wheel 24 will be transmitted to the wheels 13 and 14 equally. Other features of the Schmitz disclosure make it unsuitable for an all-terrain vehicle; note that the front wheels of the vehicle are not independently suspended and there is no suggestion that it could be modified for inclusion in a vehicle with independent suspension for the steerable wheels.

SUMMARY OF THE INVENTION

In addition to providing the features and advantages described above, it is an object of the present invention to provide a wheeled vehicle steering system which achieves coordination between the steering motion of the left and right wheels by providing independently controlled actuators, the motions of which are coordinated through the control systems thereof, thereby avoiding the necessity of direct mechanical linkage extending between the right side and left side wheels of the vehicle.

It is another object of the present invention to provide a pair of left side hydraulic cylinders and a pair of right side hydraulic cylinders for a steerable wheeled vehicle wherein one cylinder of each pair is positioned at a steerable wheel and the other cylinder of each pair is positioned in proximity to a steering lever, steering wheel, or other steering control device and coupled thereto, thereby eliminating the necessity for a conventional elongated steering column extending from the driver position to the lower front portion of the vehicle.

It is yet another object of the present invention to provide a steering system for a wheeled vehicle wherein steering motion of each of the steerable wheels is provided by a hydraulic or electric actuator positioned near or at such wheel together with means remote from the steerable wheels for coordinating the motion of the actuators to have a predetermined non-linear relation and obviating the necessity for a direct mechanical linkage between the left steerable wheel and the right steerable wheel.

It is still another object of the present invention to provide a steering system for a wheeled vehicle with at least two independently suspended steerable wheels in which the steerable wheels are each provided with a hydraulic or electric linear actuator for producing steering motion for the wheel, and such hydraulic or electric actuator is mounted with respect to the independent suspension for the wheel to allow large-angle vertical motion of the wheel suspension with turning control and power provided to the wheel through flexible connections from the vehicle body to the suspension-mounted actuators.

BRIEF DESCRIPTION OF THE DRAWINGS

In addition to the objects and advantages described above, other objects and advantages of the invention will be apparent from consideration of the following description in conjunction with the drawings in which.

DETAILED DESCRIPTION OF THE PREFERRED EMBODIMENTS

Figure 1:
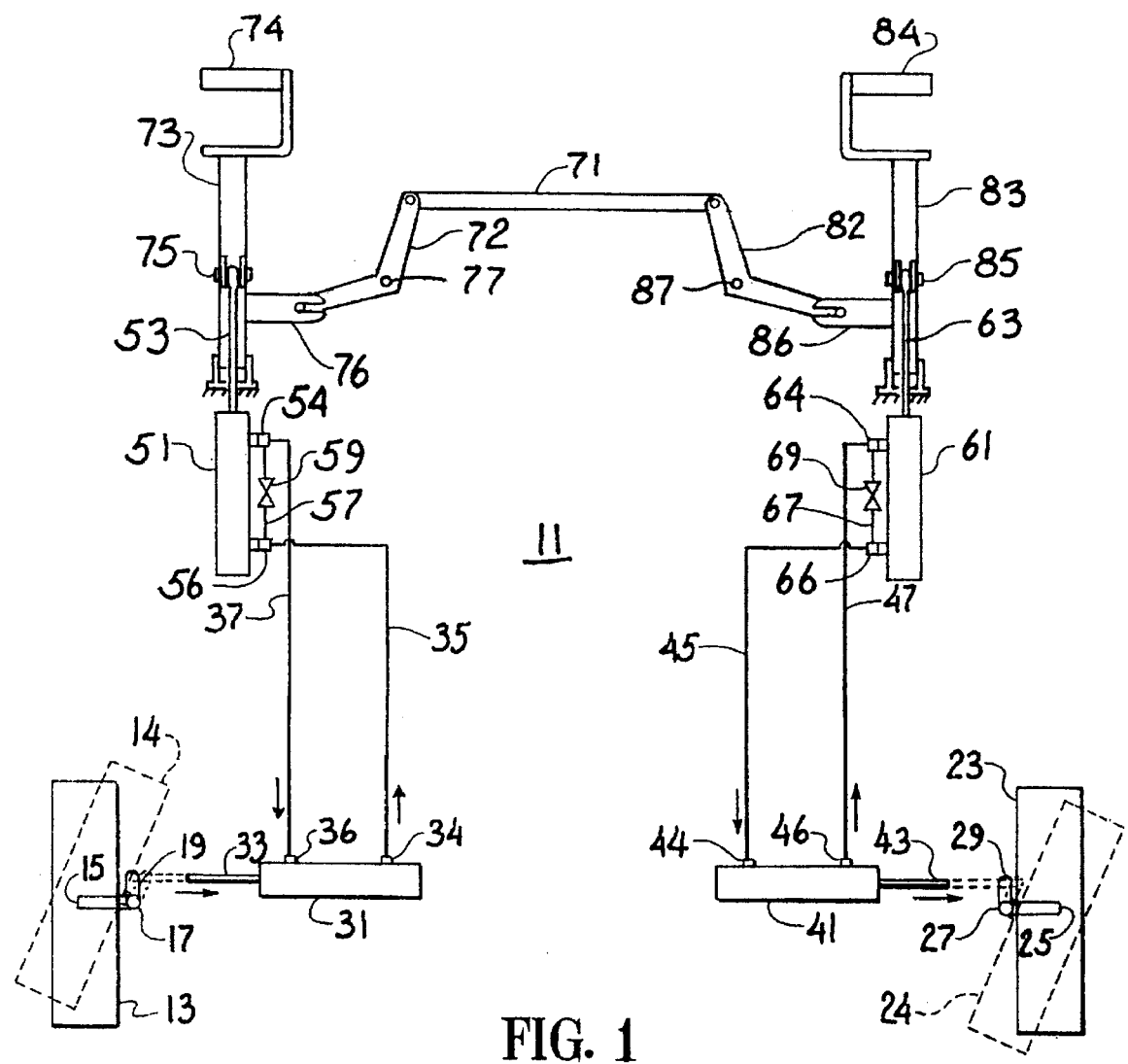
FIG. 1 is a schematic diagram of a steering lever operated hydraulic steering control system for a wheeled vehicle according to the invention.
Figure 2:
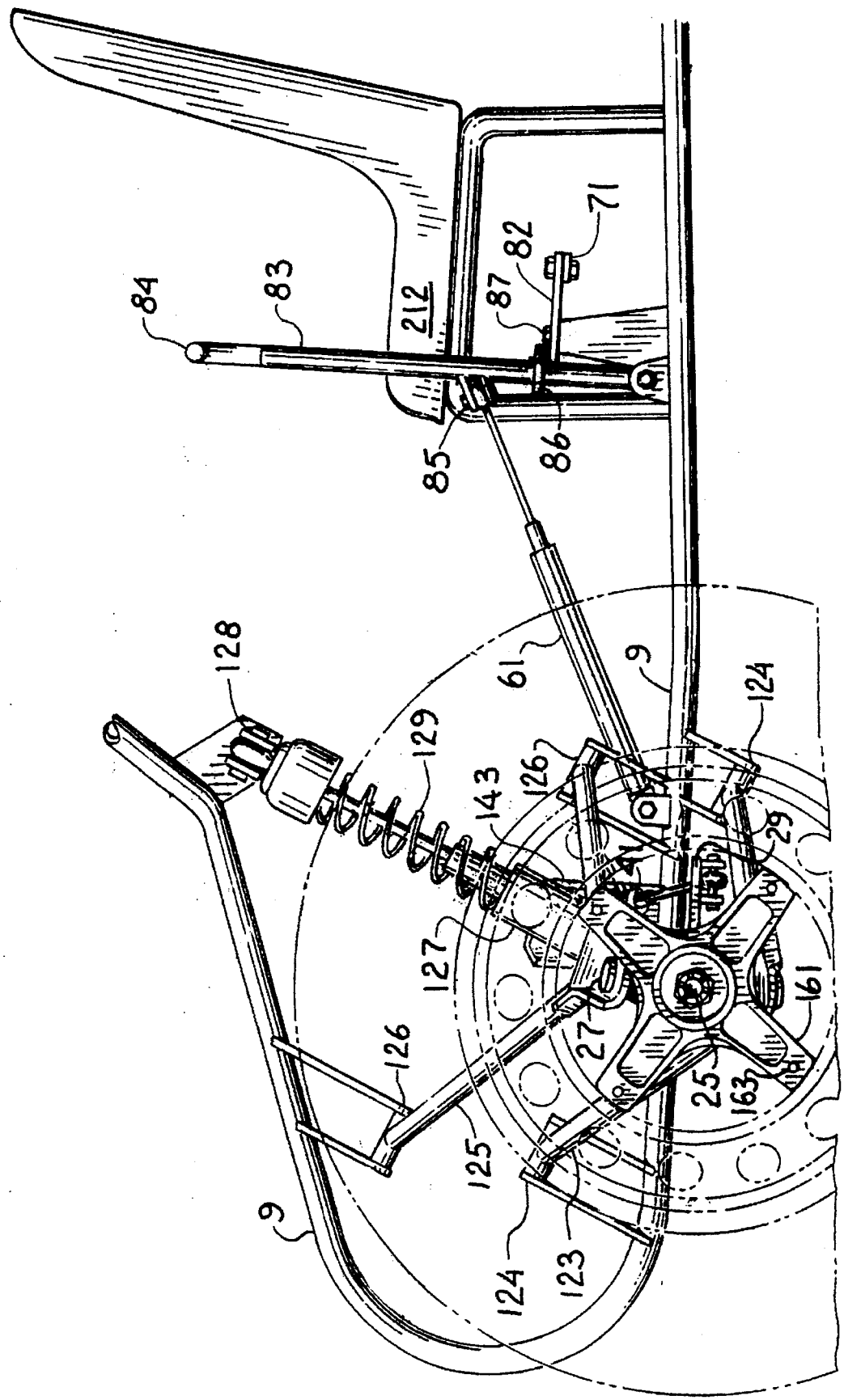
FIG. 2 is a fragmentary side elevational view of a front wheel portion of an off-road vehicle incorporating a hydraulic steering system according to the invention.

Referring now to the drawings, and in particular FIG. 1 and FIG. 2, a steering system 11 for a vehicle with a right front steerable wheel 13 and a left front steerable wheel 23 is shown wherein wheel 13 is mounted on a stub axle 15 and wheel 23 is mounted on a stub axle 25.

Wheels 13 and 23 with the stub axles 15 and 25 are mounted so that they are rotatable about a generally vertical axis to turn the vehicle to the left or to the right (as indicated by the dashed outlines 14 and 24).

Stub axle 15 has rigidly affixed thereto a steering control arm 19 and stub axle 25 has a similarly affixed steering control arm 29. Stub axle 15 and steering control 19 are pivotally mounted on a kingpin 17 which is secured is a generally vertical position on the outer end of the wheel suspension (not shown in FIG. 1). A similar symmetric arrangement is provided with respect to stub axle 25, steering control arm 29, and kingpin 27 for the vehicle left front wheel 23. As will later be described in more detail, a generally vertical axis of rotation for wheel 14 is provided by kingpin 17 throughout the substantial vertical travel of the wheel suspension relative to the vehicle body. Steering control arm 19 is mechanically coupled to a piston rod 33 of hydraulic cylinder 31 which serves to determine the angular position of wheel 13 to effect steering of the vehicle.

As will later be explained in greater detail, fluid pressure cylinder 31 is secured parallel to the wheel suspension for wheel 13 which at its upper end is pivotally secured to the vehicle body. It is understood that a single-ended double-acting hydraulic cylinder as schematically illustrated at 31 in FIG. 1 is a preferred simple, effective and readily available fluid pressure actuator for use in connection with the invention, but that numerous other forms of fluid pressure or electric actuators having linear motion actuator elements or rotary motion actuator elements could be employed. Fluid pressure cylinder 31 has a fluid port 36 connected to fluid pressure line 37 in the form of a flexible hose which is connected at its other end to a fluid port 54 of a fluid pressure cylinder 51 generally similar to fluid pressure cylinder 31.

Substantially identical symmetrically disposed elements are provided for left front wheel 23 in the form of fluid pressure cylinder 41 with actuator element 43 and fluid pressure port 44 connected through fluid pressure line 45 to fluid pressure cylinder 61 at its port 66.

Fluid pressure cylinder 31 also has a port 36 connected through line 37 to port 54 of fluid pressure cylinder 51 and fluid pressure cylinder 41 has a port 46 connected through line 47 to port 64 of fluid pressure cylinder 61. Although it is theoretically possible to use pressurized gas to operate the fluid pressure cylinder arrangements shown in FIG. 1, it is contemplated and preferred that hydraulic cylinders and hydraulic liquid would be utilized; it is preferred that the hydraulic liquid of the systems be pressurized to a moderate degree, typically on the order of 100-200 p.s.i. Fluid pressure cylinder 51 has an actuator element or piston rod 53 and fluid pressure cylinder 61 has a similar actuator element or piston rod 63.

Observing the portion of FIG. 1 thus far described, it will be seen that the hydraulic coupling of cylinders 31 and 51 (in this example assumed to be substantially identical) will cause a motion of piston rod 53 to extend and/or retract will cause an equal and opposite motion to piston rod 33 causing it to retract or extend. The same relation exists with respect to fluid pressure cylinders 41 and 61 wherein motion of piston rod 63 produces an equal and opposite motion of piston rod 43.

Piston rod 53 and 63 are coupled respectively to steering levers 73 and 83 by respective connecting pins 75 and 85. In the illustrated example, the pivots 77 and 87 on which levers 73 and 83 are mounted and the ends of cylinders 51 and 61 remote from piston rods 53 and 63 are secured to the body frame of the vehicle and thus restrained against any relative translational motion.

Steering levers 73 and 83 are provided with suitable respective handles 74 and 84. It will be apparent from the configuration shown in FIG. 1 that, when handle 74 is moved to the rear, piston rod 53 of cylinder 51 is caused to extend which in turn causes piston rod 33 of cylinder 31 to retract causing a right turning wheel motion of wheel 13 toward the position shown at 14. Accordingly, rearward motion of the right steering handle 73 causes motion of wheel 13 to steer the vehicle to the right. When steering handle 84 is moved forward it causes the piston rod 63 of cylinder 61 to retract thereby causing the piston rod 43 of cylinder 41 to extend producing a right turning motion for wheel 23 toward the position shown at 24.

Steering levers 73 and 83 are coupled together by a link 71 to cause opposite but unequal motion of steering levers 73 and 83 and to provide the desired approximate Ackerman angle relationship between the motion of wheels 13 and 23. Link 71 is pivotally connected at its right and left ends at the ends of the arms of respective bellcranks 72 and 82; near the ends of the other arms, bellcranks 72 and 82 are engaged by brackets 76 and 86 secured to steering levers 73 and 83. Bellcranks 72 and 82 reside in a generally horizontal plane and are pivotally secured to the vehicle frame by pivot pins 77 and 87. It will be noted that in the center position, link 71 forms an angle with the arm of bellcrank 82 which somewhat differs from 90°. By this means, the motions of bellcranks 72 and 82 are unequal as one departs from the centered position and by a proper design of the bellcranks and the angle thereof with respect to link 71 an Ackerman angle relationship can be fairly well approximated in the motion of wheels 13 and 23.

As best shown in FIG. 1, fluid pressure cylinder 51 is provided with a bypass fluid pressure line 57 between ports 54 and 56 in which is located a manual cut-off valve 59 which would normally be in the closed or off position. A similar bypass line 67 is provided for fluid pressure cylinder 61 together with manual cut-off valve 69 in line 67.

Since valves 59 and 69 are closed during normal operation, they and lines 57 and 67 have no affect upon the operation of the apparatus. However, the provision of valves 59 and 69 is very convenient for facilitating adjustment or alignment of the wheels and the steering system. When it is desired to align or realign the vehicle steering system, valves 59 and 69 may be opened with the result that each of the wheels 13 and 23 as well as steering levers 73 and 83 may be easily moved and positioned without affecting the other elements. Thus, with valves 59 and 69 opened, wheels 13 and 23 may be positioned manually or with the aid of a guide or jig to have the desired forward travel position with any needed toe-in or toe-out and at the same time steering levers 73 and 83 may be freely positioned to centered positions at which time valves 59 and 69 may be closed to attain alignment of the system.

Arrows on the schematic diagram of FIG. 1 are placed to aid in explanation of the operation of the system as when the vehicle is being turned to the right as is indicated by the positions of wheels 13 and 23 in dashed lines at 14 and 24. To produce such a wheel position, the left steering lever 83 would be forward (in the arrangement of FIG. 1 the driver's right is to the left of the sheet). Alternatively, rearward motion of right steering lever 73 also causes leftward motion of link 71, extension motion of piston rod 53 and retraction motion of piston rod 63.

Motions of piston rods 53 and 63 in turn cause fluid flow as indicated by arrows on lines 35 and 37 and arrows on lines 45 and 47. Fluid flow as indicated in FIG. 1 causes retraction of piston rod 33 and extension of piston rod 43, in turn causing clockwise rotation of stub axle 15 and clockwise rotation of stub axle 25. It should be noted that the arrangements and connection of the hydraulic actuators in the forms of cylinders 31, 41, 51, and 61 in FIG. 1 are subject to great variation and modification to achieve the function described above or its equivalent.

It should be noted from FIG. 1 and FIG. 2 that the motions applied to the cylinder rods 53 and 63 forming actuator elements for cylinders 51 and 61 by the motion of link 71 are not equal and opposite. For such motions to be nearly equal and opposite the (at center) angular relation between link 71 and bellcranks 72 and 82 would be approximately 90°. With this angle being substantially more than 90° and typically between 90° and 135° the motion of the piston rod being extended beyond the mid-position is greater than the motion of the piston being retracted from the mid-position.

In mathematical terms, the Ackerman angle relation generally desired for the outside wheel (OW) and the inside wheel (IW) is:

$$OW = \arctan \frac{L}{(R + t/2)}$$

$$IW = \arctan \frac{L}{(R - t/2)}$$

where L is the length of wheel base (front axle to rear axle), t is the transverse vehicle dimension (tire to tire), and R is the turning radius. A radius substantially greater than L and zero toe-in is assumed above.

Usual implementation of the Ackerman angle provision by mechanical linkages achieves a fairly good but imperfect result for small wheel angles (large turning radius), and link 71 at best will provide the mathematical relation above only approximately.

According to the invention, this nonlinearity due to link 71 alone may be utilized to effect the Ackerman angle provision in the motion of wheels 13 and 23. More commonly, the nonlinear effect of the linkage between piston rods 33 and 43 and wheels 13 and 23 respectively, combined with the nonlinear effect produced by the angular relation of bellcranks 72 and 82 with link 71 would be determined to attain the desired Ackerman provision between wheels 13 and 23. While the arrangement of link 71 has the advantage of simplicity, a more complicated mechanical connection between steering wheel 83 and cylinders 51 and 61 could be utilized to obtain a more complex and exact relationship between the motions of piston rods 53 and 63, if desired. Also the relation or other predetermined steering relations could be determined by other means as described below.

The advantages of the steering system according to the invention are well suited to off-road vehicles, especially those utilized for sport and recreation, but steering systems according to the invention may be employed in a broad range of steerable vehicles. In other forms of vehicles, numerous modifications might be desired; for example, a substantially greater turning angle for the steering wheel from lock to lock might be desirable and the incorporation of a power-assist for link 71 or bellcranks 72 or 82 might be employed.

Figure 3:
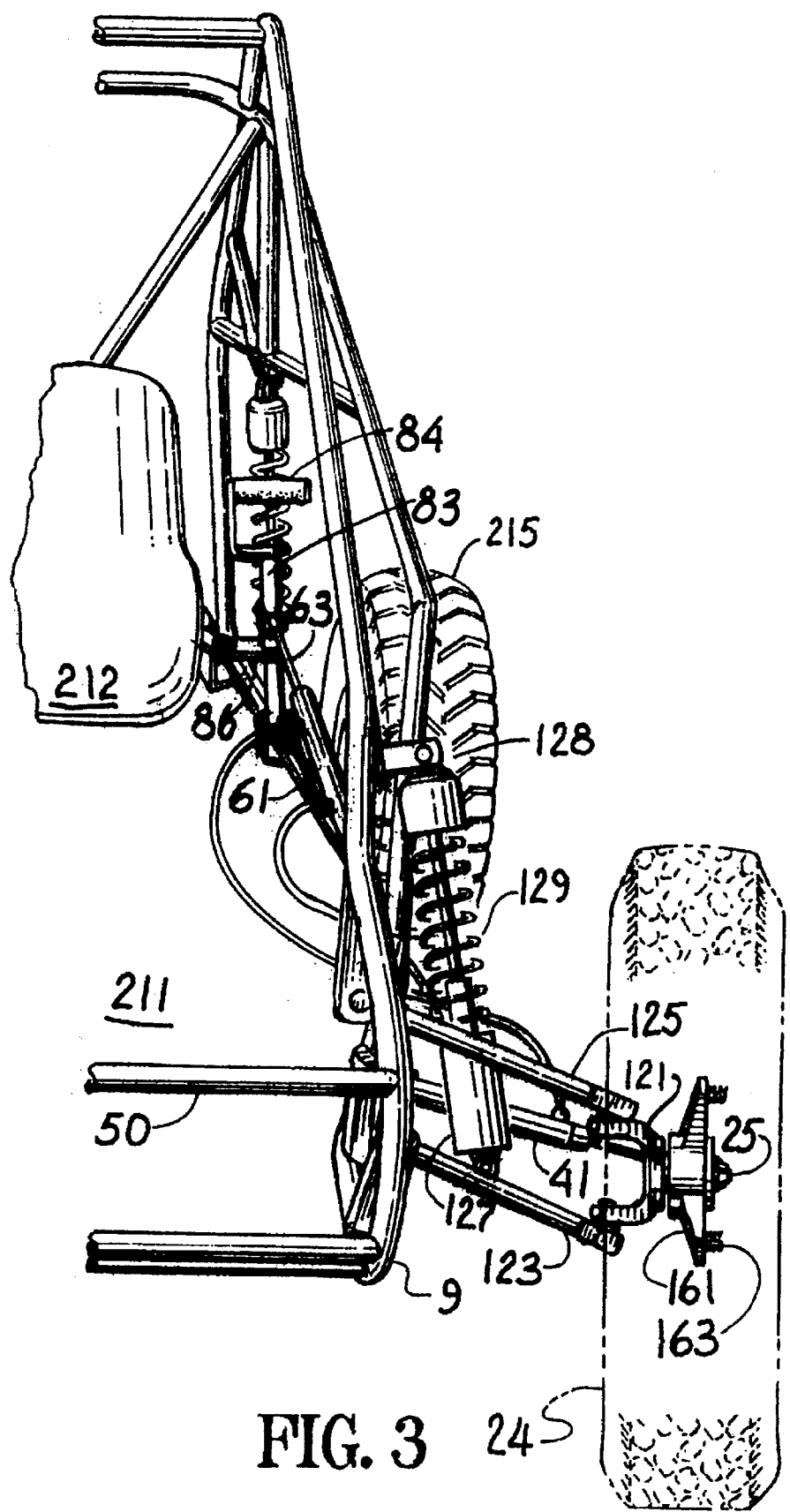
FIG. 3 is a fragmentary perspective view of the vehicle of FIG. 2.

The manner in which fluid pressure cylinders 31 and 41 may be mounted with respect to a vehicle independent suspension system may best be understood with reference to FIGS. 2 and 3. Left front wheel independent suspension of vehicle body 9 details are shown in FIGS. 2 and 3. This suspension (and the right wheel suspension which is symmetrical thereto) is of the A-frame type including upper A-frame member 125 and a lower A-frame member 123 which is provided with a cross-member 141. A-frame member 123 is pivotally mounted with respect to frame 9 at brackets 124 and A-frame member 125 is pivotally mounted to body frame 9 at brackets 126.

The axis of rotation defined by brackets 126 is generally parallel to the axis of rotation defined by brackets 124 and these axes are generally horizontal with a slight upward tilt at the forward end. This provides the suspension with a desirable attribute of permitting the front wheels to yield slightly in the rearward direction as well as in the upward direction upon receiving impact from an irregularity in the ground surface. While this feature of the suspension system would provide difficulties in the design of a conventional mechanical link steering system, the hydraulic steering system of the present invention can readily accommodate this type of suspension or any other form of independent wheel suspension.

The desired resilience and damping for the suspension system is provided by a generally conventional shock absorber 127 with coil-spring 129 mounted between cross-member 141 and bracket 128 on body frame 9.

Wheel 23 (not shown in FIG. 3) is secured on lug-bolts 163 on wheel 161 which is rotatably mounted on stub axle 25. For simplicity and clarity, the conventional anti-friction bearings, brakes and similar elements provided for the vehicle are not shown. Stub axle base 121 is pivotally mounted relative to A-frame members 123 and 125 by king-pin 27. Also secured to stub axle base 121 is steering control arm 29.

Fluid pressure cylinder 41 has its piston rod actuator element 43 secured by a universal connection 28 to a point near the end of steering control arm 29 while the opposite end of cylinder 41 is connected by a universal joint 145 to a bracket 143 on the frame of body 9. Steering control arm 29 is vertically positioned about mid-way between the outer ends of A-frame members 123 and 125 and bracket 143 similarly positions the fixed end of cylinder 41 approximately mid-way vertically between the pivotal axis defined by brackets 124 and that defined by brackets 126. Thus, throughout the large angle motion of the independent suspension and A-frame members 123 and 125, cylinder 41 is maintained in a plane which is substantially parallel to the planes of A-frame member 123 and A-frame member 125. Therefore, in the absence of extension or retraction of piston rod 43, there is little or no turning motion imparted to steering control arm 29 and to stub axle 25 by any large angle excursion of A-frame members 123 and 125.

As previously described and as shown in FIG. 2, the extension and retraction motions of piston rod 43 positively track (in the opposite direction) the motions of piston rods 63 of cylinder 61 by virtue of the pressure hydraulic hoses 47 and 45 connected between cylinder ports 44 and 46 of cylinder 41 and cylinder ports 64 and 66 of cylinder 61.

The preferred embodiment of FIGS. 1, 2, and 3 thus far described, utilize fluid pressure cylinders such as 41 of conventional form, and for convenience they are all substantially identical whereby a predetermined motion of the piston rod actuation member of one cylinder produces an equal (but perhaps opposite) motion of a cylinder connected serially therewith. Obviously, conventional cylinders of different diameters could be used in a cylinder pair in which there would be different but linearly related motion of one cylinder actuation member with respect to the other cylinder actuation member. In fact, there are a great variety of fluid pressure actuators and particularly hydraulic actuators with linear motion, with rotary motion, or of other forms which could be utilized in modifications of steering apparatus according to the present invention. For example, a rotary hydraulic actuator could be employed and positioned at the outer end of A-frame members 123 and 125 to rotate stub axle 25 and stub axle base 121 with respect thereto. Furthermore, electromagnetic rotary or linear actuators might be considered equivalent to the hydraulic actuators disclosed as the preferred embodiment herein, in certain cases it is possible that advantages accruing from such other forms of actuators would be conducive to foregoing the simplicity and reliability of the hydraulic cylinder actuators illustrated and described above.

Components of the vehicle shown in FIG. 3 not described in connection with FIGS. 1, 2, and 4 include the vehicle rear wheels 215 and the suspensions therefor partially shown at 245; the rear wheel suspension may be of any conventional form and, since these wheels are not steerable, the details thereof have not been shown and described. However, the steering system of the invention is also adaptable for four steerable wheels-vehicles and, in such case, rear wheels and suspension would be configured like those for the vehicle front wheels.

The vehicle may be provided with any desired form of driver seat 212. All other components, such as electrical equipment, instruments, engine, transmission, and engine controls, may be of conventional form and have been omitted for simplicity and clarity.

It will be understood that steering levers 73 and 83 will preferably be positioned on the right and left sides of seat 212 and slightly forward thereof rather than being centrally positioned as required of a steering wheel. This will cause cylinders 51 and 61 to be positioned at the sides of the vehicle. The exact positioning of cylinders and steering levers is subject to considerable variation and they may be arranged with the levers generally vertical or in a horizontal or oblique orientation.

A major advantage of the steering lever type system over the steering wheel type system resides in the fact that the space forward of the driver position is cleared of all obstacles related to the steering system, thereby improving crash safety of the vehicle. Another less apparent advantage of the steering lever system is that, with appropriate vehicle body design and steering lever positioning, the vehicle could be entered from directly in front rather than from the side. This releases constraints on the design of the roll-over cage for the body associated with permitting side entry into and exit from the vehicle. Typically, side entry into the vehicle is difficult at best and a front entry vehicle would be substantially more accessible. These considerations are, of course, of greatest consideration in respect to an all terrain vehicle as described and illustrated.

It should be pointed out that numerous variations and modifications to the steering system are possible. As shown in FIG. 4, for example, a hybrid of the system in FIG. 1 and a wheel-steered system in the prior copending application may be employed in which the steering wheel and gear box of FIG. 1 and of the parent application are eliminated, but a link connecting cylinders 51 and 61 is retained; then, rather than connecting steering levers 73 and 83 to cylinders 51 and 61, two additional cylinders 451 and 461 are provided, making a total of six, and each of these two additional cylinders are connected in series in a respective loop of cylinders 31, 51, 451 and cylinders 41, 61, 461. Since all cylinders in a loop are constrained to have equal motion and link 471 determines the nonlinear relationship of motion of actuator elements 53 and 63 and all other actuator elements coupled therewith, there is no necessity for a linkage such as 71, 72, 82 interconnecting steering levers 73 and 83.

Figure 4:
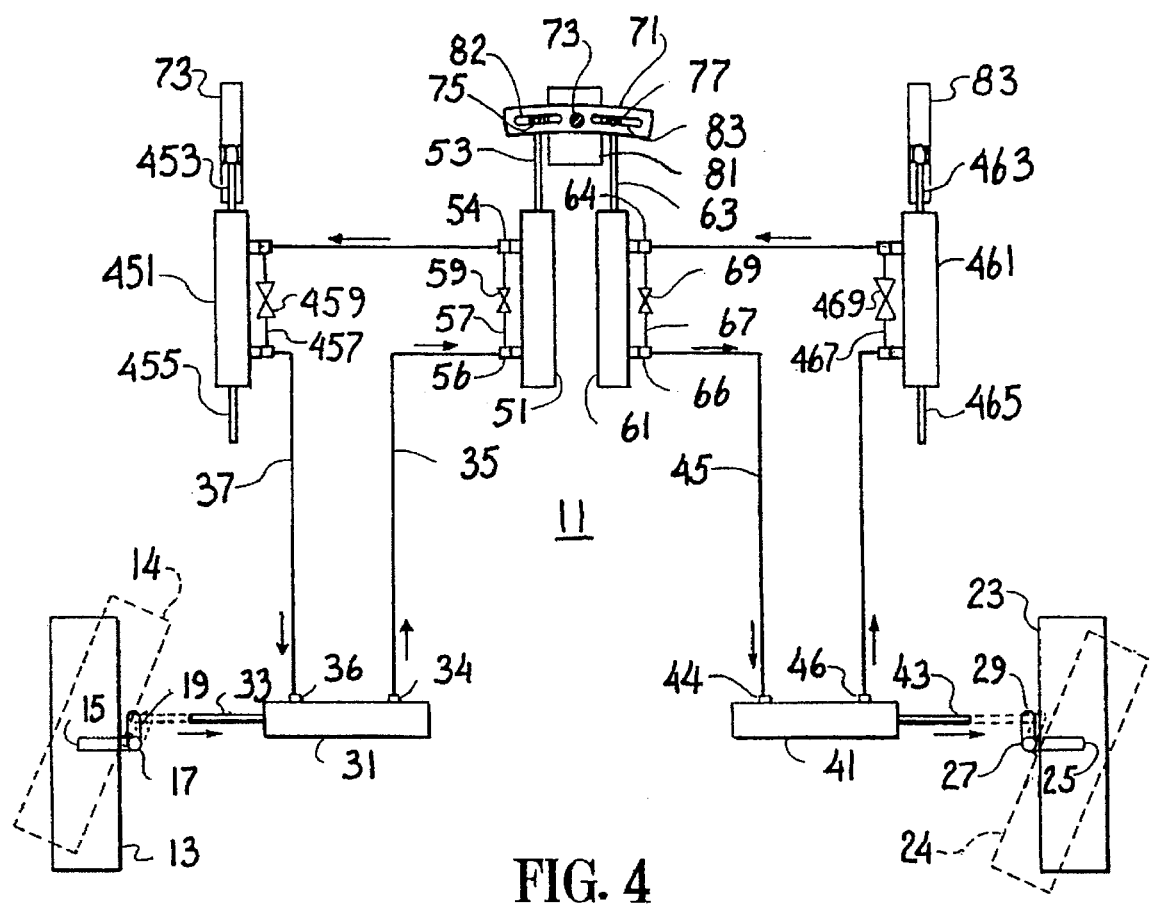
FIG. 4 is a schematic diagram of an alternative embodiment of the system of FIG. 1.

As seen in FIG. 4, fluid pressure cylinder 451, like fluid pressure cylinder 51, is provided with a bypass fluid pressure line 457 between ports 454 and 456 in which is located a manual cut-off valve 459 which is normally closed in an off position. A similar bypass line 467 is provided for fluid pressure cylinder 461 together with a manual cut-off valve 469 in line 467. Since valves 459 and 469 are closed during normal operation, they and lines 57 and 67 have no effect upon the operation of the apparatus.

Through the operation of valves 459 and 469, one may, in an alignment procedure or for any other reason, position steering levers 73 and 83 while wheels 13 and 23 are positioned to the straight-ahead position. This permits correction of misalignment that might occur and also permits the steering levers to be positioned for the individual convenience of different drivers. Alignment and positioning of wheels 13 and 23 relative to each other and relative to link 471 would proceed substantially as described with respect to FIG. 1.

It will be noted that cylinder 451 is a double ended cylinder with piston rods 453 and 455 extending from its respective end. Piston rod 453 serves to couple cylinder 451 to steering lever 71 while piston rod 455 does not serve as an actuation device. It is desirable to have the double acting, double ended cylinder 451 because it has equal displacements of liquid to and from its respective ports 454 and 456 for any given displacement of piston rod 453; this is not true of single ended, double acting pistons such as 31, 41, 51, and 61. The equal and opposite displacement characteristic of cylinder 451 makes it essentially of no effect in respect to the operational relationship between cylinders 31 and 51. For the same reasons, cylinder 461 is a double ended cylinder having an active piston rod 463 and an inactive piston rod 465.

Link 471 is secured in fixed position relative to cylinders 51 and 61 by a plate 481 to which it may be pivotally secured by a pin 473. Located at the ends of piston rods 53 and 63 are cam followers 475 and 477 which may take the form of an anti-friction bearing or a cylinder of anti-friction material; link 471 is provided with camming slots 482 and 483 which are engaged by cam followers 475 and 477.

A non-linear relationship between the motion of piston rods 53 and 63 can be determined by the shape and position of slots 482 and 483 in accordance with conventional mechanical engineering techniques. It will be apparent that if the slots 482 and 483 were straight and positioned 180° with respect to one another, that the motions of piston rods 53 and 63 would be equal and opposite. If slots 482 and 483 are not positioned 180° apart, then a significant non-linear relationship is produced within the motion of piston rods 53 and 63, and still more complex relationships may be obtained as desired by imparting curvature to the slots 482 and 483. Only a slight departure from a 180° relationship (or polar symmetry) as indicated in FIG. 4 will provide a substantial non-linerarity in the motion of piston rods 53 and 63. Link 471 and the mechanism associated therewith is only one example of many mechanical linkages that could be utilized to achieve a close approximation of the desired non-linear relationship between the motion of piston rod 53 and the motion of piston rod 63 which will result in the desired Ackerman angle relationship of the motions of wheels 13 and 23.

The hand lever actuated hydrostatic manual steering systems of FIGS. 1 and 4 expands on previous embodiments by removing the necessity of a steering wheel. The control of the vehicle may be accomplished with a single or double handle. The double handle configuration would give the operator the sense of driving a motorcycle using the handle bars except the center section of the handle bars would be gone. This allows entry to and exit from the vehicle through the front of the vehicle, if desired, and it removes the danger of the steering wheel and the necessary support structure upon which a person may be impaled in the event of an accident. This then allows increased ride-down distance which can be incorporated into the vehicle restraint system to reduce injuries.

The Ackerman steering is accomplished by a system of bellcranks or other mechanical linkage elements and tie rods in the cockpit or elsewhere and not with the angular relationships of a tracking rod, tracking arm, and steering knuckle.

The designer is free to arrange these elements to optimize suspension travel and to prevent bump steer. The steering actuator may be mounted on the suspension system to ride with the wheel. It may be a linear actuator as shown or a rotary actuator which mounts on the steering axis of each wheel. Steering alignment is made simple and easy by opening a valve on the steering control cylinder and then aligning the wheels and handle positions then closing the valves.

Prior application Ser. No. 08/230311, filed Apr. 20, 1994, now U.S. Pat. No. 5,435,407, provides a more complete description of the relation of the actuators for wheels 13 and 23 to their independent suspension and that application is incorporated by reference herein.

Figure 5:
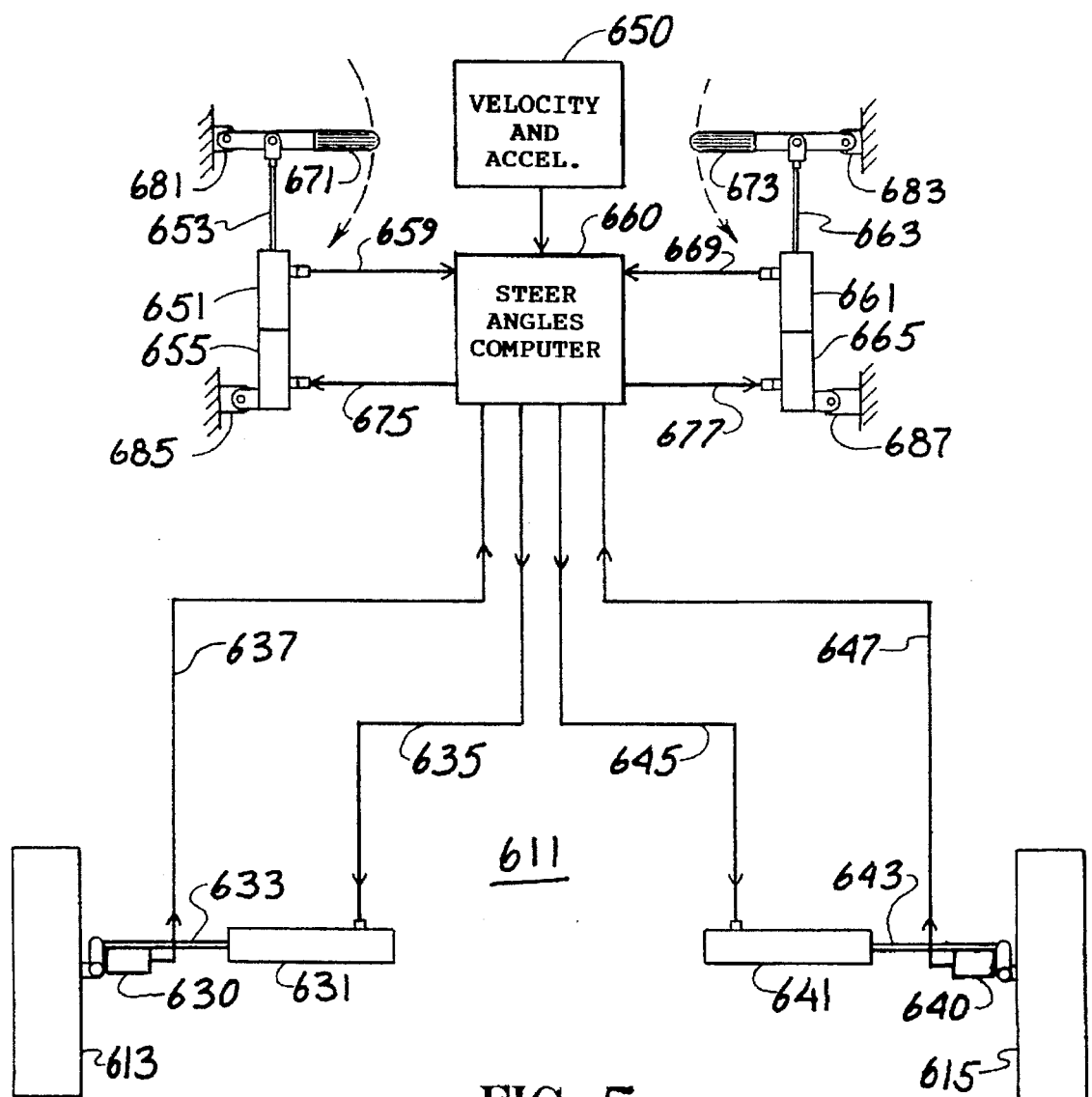
FIG. 5 is a schematic diagram of an alternative embodiment of the system of FIG. 1 employing electric actuators.

A further alternative embodiment of a steering system according to the invention is shown diagrammatically in FIG. 5. The system of FIG. 5 is particularly adapted to the use of electrical actuators for providing steering motion to the wheels 13 and 15 but the apparatus of FIG. 5 could be combined with that of FIGS. 1-4 to provide the advantages of FIG. 5 while still using hydraulic actuators or servomotors.

Actuator 631 and actuator 641 preferably take the form of electrical servomotors with respective actuator rods 633 and 643 for imparting motion to wheels 13 and 15. A steering angles computer 660 provides digital or analog signals to actuators 631 and 641 through signal transmission lines 635 and 645 respectively. Transmission lines 635 and 645 will normally be physical conductors dedicated to transmitting control signals to actuators 631 and 641. As indicated the arrows on lines 635 and 645, the primary information flow is from steering angles computer 660 to actuators 631 and 641, but this does not preclude the use of feedback signals or other signals propagating in the opposite direction.

Actuator rod 633 is provided with a force sensor 630 and actuator 643 is provided with a force sensor 640. Force sensors 630 and 640 may utilize a strain gage apparatus to provide an electrical signal representative of the force imparted to wheels 13 and 15 by actuators 631 and 641 or on the other hand road contact forces on wheels 13 and 15 transmitted back to actuators 631 and 641. Electrical transmission lines 637 and 647 convey the signals from force sensors 630 and 640 back to the steering angles computer 660.

Optionally the steering angles computer 660 may also receive vehicle velocity and acceleration from a velocity and acceleration package 650. Vehicle velocity may be obtained from wheel rotation rate wheel rotation rate or other data and accelerations both lateral and longitudinal may be obtained from accelerometers, gyroscopes, or other well known sensing devices. Availability of velocity and acceleration data enables the steering angles computer 660 to generate warning of hazardous steering motions, skidding or incipient skidding, and, if desired, could initiate corrective steering action to regain control of the vehicle.

The steering levers 671 and 673 shown in FIG. 5 are indicated somewhat schematically as they can take numerous forms. They may be substantially the same as shown in FIG. 4 or may be pivoted about an axis other than the lateral horizontal axis indicated in FIG. 4. Steering levers 671 and 673 are pivotally secured relative to the vehicle frame by brackets 681 and 683. As steering lever 671 is moved by the vehicle driver, its motion is imparted to actuation rod 653 which is free to reciprocate with respect to position sensing device 651 connected by signal transmission line 659 to steering angles computer 660. Preferably formed integrally with position sensor 651 is an artificial feel device 655 and these two devices are restrained relative to the vehicle frame by bracket 685. Position signals from position sensor 651 are transmitted to steering angles computer 660 over signal transmission line 659, and artificial feel signals derived from force sensor 630 are transmitted by computer 660 to artificial feel element 655 by means of signal transmission line 675.

In a substantially identical fashion, symmetrically disposed left steering lever 673 is pivotally mounted relative to the vehicle frame by bracket 683 and the position of actuation rod 663 is sensed by position sensor 661 the signal of which is transmitted over transmission line 669 to the steering angles computer 660. Left wheel artificial feel signals are transmitted from computer 660 over signal transmission line 677 to artificial feel element 665 which, together with position sensor 661, is restrained relative to the vehicle body by a pivotal connection at bracket 687.

While the hydraulic cylinder implemented system of FIGS. 1 and 4 inherently provides feel of the road feedback to the vehicle driver, this is desirably accomplished in the system utilizing electrical actuators 631 and 641 by the artificial feel components of the system described above. Artificial feel systems are particularly well known, particularly with respect to aircraft controls and many versions of such systems could be adapted by one skilled in the art to provide the desired degree of feedback and artificial feel to the driver operating steering levers 671 and 673. Artificial feel systems for aircraft controls, sometimes known as force feel systems have been well known for decades as illustrated, for example, by U.S. Pat. No. 3,463,423 for "Electromechanical Force Feel System For Aircraft Control Stick", issued Aug. 26, 1969 (U.S. Cl. 244/83) and U.S. Pat. No. 3,733,039 for "Feel Augmentation Control System For Helicopters", issued May 15, 1973 (U.S. Cl. 244/77d).

Of course, the system of FIG. 5 could be simplified by eliminating the elements for providing artificial feel at the steering levers 671 and 673 and the remaining system would be totally operational and reliable without the improvement provided by the artificial feel features. In the system of FIG. 5, the artificial feel elements 655 and 665 or other means may be relied upon to coordinate the motions of steering levers 671 and 673 to be substantially equal and opposite, or one may choose not to constrain the relative motions of steering levers 671 and 673 relative to one another, but to take the difference in the position of the steering levers to be the indication of vehicle turning control from which wheel-steer angles are computed.

Whereas, the present invention has been described in relation to the drawings attached hereto, it should be understood that other and further modifications, apart from those shown or suggested herein, may be made within the spirit and scope of this invention.

What is claimed is:

1. In a land vehicle having a frame and at least four wheels including at least a a pair of non-steerable rear wheels, a first steerable front wheel and a second steerable front wheel, a computer controlled, independently actuated wheel steering system comprising:

a computer having at least one signal input and at least two signal outputs;

a first actuator adapted to receive a first wheel angle control signal from said computer and physically connected to cause turning of said first steerable front wheel relative to said frame about a generally vertical steering axis for said first wheel;

a second actuator adapted to receive a second wheel angle control signal from said computer and physically connected to cause turning of said second steerable front wheel relative to said frame about a generally vertical steering axis for said second wheel;

at least one driver operated control element for generating a steering control signal in response to the position thereof and having means for transmitting said steering control signal to one of said at least one signal input; and means for causing the resistive force to movement of said control element to be responsive to the magnitude of turning force applied between at least one of said actuators and one of said steerable wheels;

said computer causing distinct first and second wheel angle control signals to be generated, each being a different function of said steering control signal;

whereby a predetermined steering angle relation can be maintained between first wheel and second wheel turn angles to provide a predetermined control characteristic.

2. Apparatus as recited in claim 1 wherein said computer comprises a digital computer.

3. Apparatus as recited in claim 1 wherein said at least one driver operated control element comprises a left hand steering lever and a right hand steering lever.

4. Apparatus as recited in claim 1 wherein said first actuator and said second actuator are hydraulic actuators.

5. Apparatus as recited in claim 3 wherein said first actuator and said second actuator are hydraulic actuators.

6. Apparatus as recited in claim 2 wherein said at least one driver operated control element comprises a left hand steering lever and a right hand steering lever.

7. In a land vehicle having a frame and at least four wheels including at least a a pair of non-steerable rear wheels, a first steerable front wheel and a second steerable front wheel, an independently controlled, independently actuated wheel steering system comprising:

means for generating two control signals each having a different predetermined relation to a steering input signal and having at least one signal input port and at least two signal output ports;

a first actuator adapted to receive a first wheel angle control signal from said means for generating two control signals and physically connected to cause rotation of said first steerable front wheel relative to said frame about a generally vertical steering axis for said first wheel;

a second actuator adapted to receive a second wheel angle control signal from said means for generating two control signals and physically connected to cause rotation of said second steerable front wheel relative to said frame about a generally vertical steering axis for said second wheel;

at least one driver operated control element for producing a steering control signal in response to the position thereof and transmitting said steering control signal to one of said at least one signal input port;

said means for generating two control signals causing distinct first and second mathematically determined variable wheel angle control signals to be generated, each being a different function of said steering control signal;

whereby a predetermined steering angle relation can be maintained between first wheel and second wheel turn angles to provide a predetermined control characteristic.

8. Apparatus as recited in claim 7 wherein said means for generating two control signals comprises a digital computer.

9. Apparatus as recited in claim 7 wherein said at least one driver operated control element comprises a left hand steering lever and a right hand steering lever.

10. Apparatus as recited in claim 7 wherein said first actuator and said second actuator are hydraulic actuators.

11. In a land vehicle having a frame and at least four wheels including at least a a pair of non-steerable rear wheels, a first steerable front wheel and a second steerable front wheel, a steering system providing independently actuated wheel steering motion for each of said steerable wheels comprising:

a first actuator adapted to receive a first wheel angle control signal and mechanically connected to cause rotation of said first steerable front wheel relative to said frame about a generally vertical steering axis for said first steerable front wheel;

a second actuator adapted to receive a second wheel angle control signal and mechanically connected to cause rotation of said second steerable front wheel relative to said frame about a generally vertical steering axis for said second steerable front wheel;

a driver operated control element comprising a left hand controlled steering lever and a right hand controlled steering lever for generating at least one steering control signal in response to the positions of said levers; and means for receiving said at least one steering control signal and for transmitting to said first actuator and said second actuator distinct first and second wheel angle control signals derived from said at least one steering control signal, the relation between said wheel angle control signals being determined to provide an Ackerman angle relation between respective steerable front wheel turn angles;

whereby a predetermined control characteristic is achieved.

12. Apparatus as recited in claim 11 wherein said means for receiving said at least one steering control signal comprises a digital computer.

13. Apparatus as recited in claim 11 wherein said first actuator and said second actuator are hydraulic actuators.

14. In a land vehicle having a frame and at least four wheels including at least a a pair of non-steerable rear wheels, a first steerable front wheel having a first independent suspension and a second steerable front wheel having a second independent suspension, a steering system providing independently actuated wheel steering motion for each of said steerable front wheels comprising:

a first actuator adapted to receive a first wheel angle control signal being supported at least in part by said independent suspension and mechanically connected to cause rotation of said first steerable wheel relative to said frame about a generally vertical steering axis for said first steerable front wheel;

a second actuator adapted to receive a second wheel angle control signal being supported at least in part by said independent suspension and mechanically connected to cause rotation of said second steerable wheel relative to said frame about a generally vertical steering axis for said second steerable front wheel;

a driver operated control including a left hand steering lever and a right hand steering lever for generating at least one steering control signal in response to the position thereof; and means for receiving said at least one steering control signal and for transmitting to said first actuator and said second actuator distinct first and second wheel angle control signals derived from said at least one steering control signal, the relation between said wheel angle control signals being determined to provide an Ackerman angle relation between respective steerable front wheel turn angles;

whereby a predetermined control characteristic is achieved.

15. Apparatus as recited in claim 14 wherein said first actuator and said second actuator are hydraulic actuators.

16. Apparatus as recited in claim 15 wherein said means for receiving said at least one steering control signal comprises a digital computer.

17. Apparatus as recited in claim 14 wherein said means for receiving said at least one steering control signal comprises a digital computer.

* * * * *

UNITED STATES PATENT AND TRADEMARK OFFICE
CERTIFICATE OF CORRECTION

PATENT NO. : 5,653,304

DATED : August 5, 1997

INVENTOR(S) : David A. RENFROE

It is certified that error appears in the above-indentified patent and that said Letters Patent is hereby corrected as shown below:

Cover Page, [57] ABSTRACT, line 13 of text, delete "now-linear" and substitute therefor --non-linear--;

Col. 1, line 22, delete "armby" and substitute --arm by-- therefor;

Col. 13, line 57 (claim 11, line 2), delete the first occurrence of "a"; and

Col. 14, line 26 (claim 14, line 2), delete the first occurrence of "a";

Signed and Sealed this

Twenty-eighth Day of October, 1997

*Attest:*

BRUCE LEHMAN

*Attesting Officer*     *Commissioner of Patents and Trademarks*